(12) United States Patent
Godet et al.

(10) Patent No.: US 11,760,308 B2
(45) Date of Patent: Sep. 19, 2023

(54) METHOD FOR ACTIVATING A FUNCTION OF A VEHICLE BY ULTRA HIGH FREQUENCY WITH AN ITEM OF PORTABLE USER EQUIPMENT AND DEVICE FOR ACTIVATING AN ASSOCIATED FUNCTION

(71) Applicant: Continental Automotive Technologies GmbH, Hannover (DE)

(72) Inventors: Sylvain Godet, Toulouse (FR); Stéphane Billy, Toulouse (FR); Ingrid Horatius, Toulouse (FR)

(73) Assignee: Continental Automotive Technologies GmbH

( * ) Notice: Subject to any disclaimer, the term of this patent is extended or adjusted under 35 U.S.C. 154(b) by 0 days.

(21) Appl. No.: 18/008,840

(22) PCT Filed: Jun. 14, 2021

(86) PCT No.: PCT/EP2021/065908
§ 371 (c)(1),
(2) Date: Dec. 7, 2022

(87) PCT Pub. No.: WO2021/254936
PCT Pub. Date: Dec. 23, 2021

(65) Prior Publication Data
US 2023/0192033 A1 Jun. 22, 2023

(30) Foreign Application Priority Data
Jun. 15, 2020 (FR) ........................................ 2006199

(51) Int. Cl.
*B60R 25/24* (2013.01)
*G07C 9/00* (2020.01)
*H04B 17/318* (2015.01)

(52) U.S. Cl.
CPC ........ *B60R 25/245* (2013.01); *G07C 9/00309* (2013.01); *H04B 17/318* (2015.01);
(Continued)

(58) Field of Classification Search
None
See application file for complete search history.

(56) References Cited

U.S. PATENT DOCUMENTS

| | | | |
|---|---|---|---|
| 11,203,323 B2* | 12/2021 | Godet | ................... H04B 1/3822 |
| 2020/0010050 A1* | 1/2020 | Spick | ...................... E05F 15/00 |
| 2020/0186970 A1* | 6/2020 | Dekovich | ............. B60R 25/245 |

FOREIGN PATENT DOCUMENTS

| | | |
|---|---|---|
| EP | 3339877 A1 | 6/2018 |
| FR | 3085813 A1 | 3/2020 |
| WO | 2019155167 A1 | 8/2019 |

OTHER PUBLICATIONS

English Translation of the Written Opinion for International Application No. PCT/EP2021/065908, dated Oct. 1, 2021, 8 pages.
(Continued)

*Primary Examiner* — Carlos Garcia
(74) *Attorney, Agent, or Firm* — RatnerPrestia

(57) ABSTRACT

A UHF communication method for activating a motor vehicle function with a portable item of user equipment, based on the presence of the portable item of equipment in predetermined areas around the vehicle. The portable item transmitting a first signaling event at a predetermined period on at least one signaling channel. The first event including at least one signaling frame having a data block. The method including: a predetermined number of additional signaling events transmitted to the vehicle during the period; a request signal received from the vehicle, for each signaling frame of each event received by the vehicle; sending a response frame upon receipt of the request signal by the portable item; determining the presence of the portable item in one of the
(Continued)

predetermined areas based on the strength values of the received signal; activating a vehicle function based on the determined presence of the portable item of equipment.

12 Claims, 4 Drawing Sheets

(52) U.S. Cl.
CPC ... *B60R 2325/101* (2013.01); *B60R 2325/205* (2013.01); *G07C 2009/00793* (2013.01); *G07C 2209/63* (2013.01)

(56) References Cited

OTHER PUBLICATIONS

Lindh et al., "Bluetooth® Low Energy Beacons", Texas Instruments Application Report SWRA475, Jan. 14, 2015, 13 pages, Retrieved from the Internet: http://www.ti.com/lit/an/swra475/swra475.pdf, [retrieved on Apr. 2, 2015], XP055181070.
International Search Report and Written Opinion for International Application No. PCT/EP2021/065908, dated Oct. 1, 2021, 10 pages.
International Search Report and Written Opinion for International Application No. PCT/EP2021/065908, dated Oct. 1, 2021, 15 pages (French).
French Search Report for French Application No. 2006199, dated Mar. 2, 2021 with translation, 12 pages.

\* cited by examiner

Fig. 2                    Prior Art
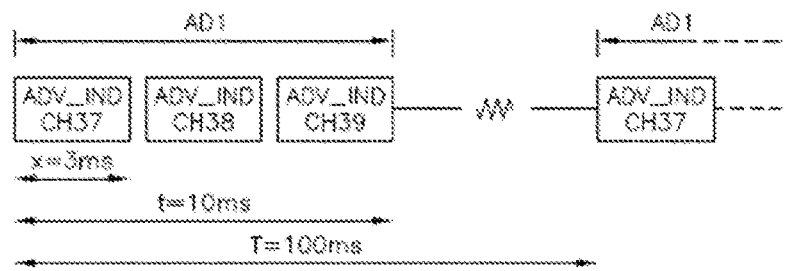
Fig. 3
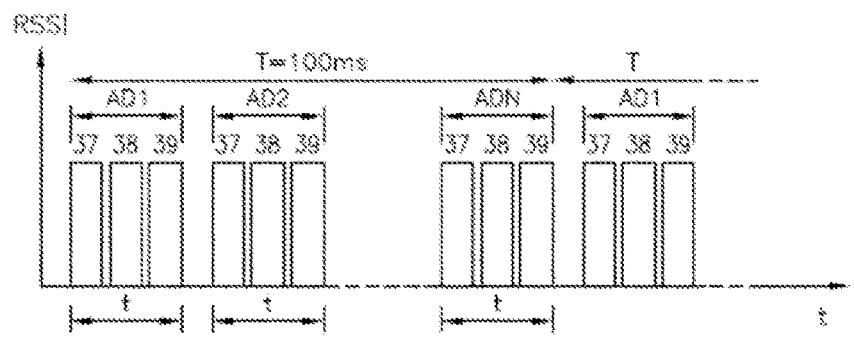
Fig. 4
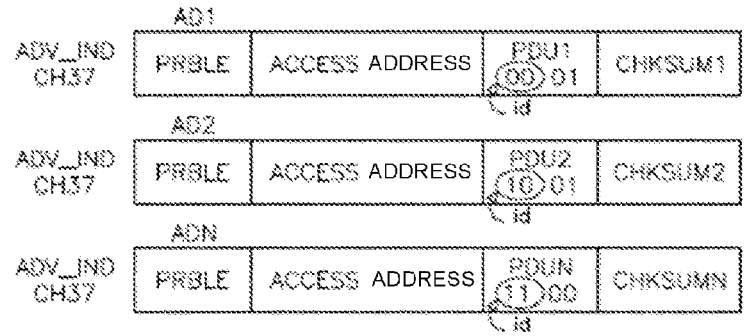

METHOD FOR ACTIVATING A FUNCTION OF A VEHICLE BY ULTRA HIGH FREQUENCY WITH AN ITEM OF PORTABLE USER EQUIPMENT AND DEVICE FOR ACTIVATING AN ASSOCIATED FUNCTION

CROSS REFERENCE TO RELATED APPLICATIONS

This application is the U.S. National Phase Application of PCT International Application No. PCT/EP2021/065908, filed Jun. 14, 2021, which claims priority to French Patent Application No. 2006199, filed Jun. 15, 2020, the contents of such applications being incorporated by reference herein.

FIELD OF THE INVENTION

The invention relates to an ultra-high-frequency-based method for activating a function of a vehicle, of BLE® (Bluetooth Low Energy) type, with a portable item of user equipment, for example a smartphone, and to an associated device for activating a function.

The invention applies more specifically to "hands-free" access systems for accessing motor vehicles. What is known as a "hands-free" access system for accessing a motor vehicle allows an authorized user to lock and/or unlock the opening elements of his vehicle without having to physically press buttons on a key. For this purpose, the vehicle identifies a portable item of equipment such as a fob or remote control carried by the user or even a key, and if the fob or the remote control or else the key is located in a predetermined area around the vehicle or in the vehicle and is identified as belonging to the vehicle, then the vehicle automatically locks/unlocks its opening elements depending on the user's intention, without the user having to physically manipulate a key.

BACKGROUND OF THE INVENTION

This "hands-free" access system is known to a person skilled in the art. It is generally composed of an electronic control unit on board the vehicle, one or more radiofrequency (LF) antennas located on the vehicle and an identification fob or remote control comprising an RF antenna, carried by the user.

An identifier exchange between the portable item of equipment and the vehicle via the RF antennas and the electronic control unit allows the vehicle to identify the portable item of equipment and makes it possible to trigger the locking or unlocking of the opening elements of the vehicle.

The identifier may be contained in a portable item of equipment other than a fob or a remote control; for example, it may be contained in a mobile telephone or smartphone carried by the user, or a watch worn by the user.

The identifier exchange is generally carried out via radiofrequency (RF) waves and via low-frequency (LF) waves. The vehicle first transmits, via the LF antennas, an LF interrogation signal and the portable item of equipment, if it is located within the reception area of said signal (i.e. a predetermined area around the vehicle), sends an RF presence message containing its identifier back to the vehicle.

The precise locating of the portable item of equipment around the vehicle is carried out by measuring the strength of the LF signal, originating from the vehicle, received by the portable item of equipment (via the antennas and the electronic control unit), which measurements are more commonly known as RSSI ("received signal strength indication" measurements, or measurement of the power of a signal received by an antenna at reception). The measurement of the power of the signal, originating from each LF antenna, received by the portable item of equipment is received and analyzed by a locating device on board the vehicle, which thereby determines the position of the portable item of equipment with respect to said LF antennas, that is to say with respect to the vehicle.

Depending on the location of the portable item of equipment identified by the vehicle, in said location areas, some actions/functions specific to said location areas are carried out automatically: unlocking/locking or preliminary activation of the passenger compartment lighting system (also called "welcome lighting").

The RSSI measurement makes it possible to precisely locate the portable item of equipment in the location areas, that is to say around the vehicle, so as to make it possible not only to lock/unlock the opening elements, but also to start the vehicle, when the portable item of equipment is detected inside the vehicle.

If the portable item of equipment is a mobile telephone, RF (for example in the ISM bands) and LF (for example at 125 kHz) communication with the vehicle is not always possible, since most mobile telephones do not have any RF, or LF, communication means whose frequencies are compatible with those used during communication with a vehicle, such as the frequencies of 315 MHz and 433.92 MHz for RF and 125 kHz for LF.

On the other hand, mobile telephones now employ the Bluetooth® and Bluetooth Low Energy "BLE" communication standard, that is to say communication at ultra-high frequency (UHF) from 2402 MHz to 2480 MHz. This communication standard has the advantage of being universal and therefore does not require any accreditation specific to each country (only a "Bluetooth Low Energy" international certification), as is the case with the current RF and LF communication standards whose operating frequency differs according to country.

It therefore becomes necessary to adapt the "hands-free" access and/or starting system to a vehicle so that it is also able to operate with a mobile telephone equipped with the Bluetooth® communication standard and no longer solely by way of radio waves and low-frequency waves (RF, LF).

The advantage of the Bluetooth® communication standard is that it allows a long communication range of approximately 250 m around the vehicle. However, it does not allow the presence of the portable item of equipment to be detected precisely at shorter distances. The precise locating of the portable item of equipment around the vehicle, which was possible with the communication device from the prior art, operating based on an exchange through RF and LF waves, is no longer possible using Bluetooth®. Specifically, the RSSI measurement of a Bluetooth signal is very imprecise and varies greatly depending on the environment (noise, interference, reflections, etc.) and it is not possible to ascertain whether the portable item of equipment, whose position is fixed, is 5 m, 10 m, 40 m or more away from the vehicle.

Given the large variation in the RSSI of Bluetooth®, it is therefore no longer possible to precisely locate the position of the portable item of equipment in a close area around the authorized vehicle, in order for example to unlock the vehicle.

One solution from the prior art for improving the precision on the position of the portable item of equipment consists in carrying out a multitude of RSSI measurements in order to increase the precision on the final RSSI value. For this purpose, it is known to use at least 20 RSSI measurements, and then to apply a statistical calculation, for example a calculation of the average or the median, to the 20 collected measurements in order to determine a reliable final RSSI value therefrom.

However, performing 20 RSSI measurements requires sending 20 messages in BLE mode: each message in BLE mode, destined for the portable item of equipment, will be followed, if it is located within the BLE communication reception area, by a response containing an RSSI measurement. These BLE messages are also called, in the BLE protocol, "advertising" frames or frames sent in "advertising" mode.

However, the Android® mobile operating system does not allow the transmission of BLE "advertising" frames at a period of less than 100 ms. This period limitation is imposed by the Android operating system for the BLE application.

Thus, to send 20 frames, with a period of 100 ms between each frame, a reliable RSSI value is able to be determined only after 2 seconds. This delay of 2 s for locating the portable item of user equipment and thus activating the associated function, for example unlocking the opening elements of the vehicle, is far too long and creates a wall effect when the user wishes to open his vehicle. In other words, when said user touches the door handle of his vehicle, his portable item of equipment has not yet been located within the secure perimeter around the vehicle, and the door does not unlock.

An aspect of the invention proposes an ultra-high-frequency communication-based method for activating a function of a vehicle with a portable item of user equipment and an associated device for activating a function that make it possible to overcome these drawbacks.

In this case, an aspect of the invention proposes a method for activating a function through ultra-high-frequency waves in order to remotely activate a function of the vehicle, such as the remote unlocking/locking of the opening elements, which method is faster than the prior art and reliable.

SUMMARY OF THE INVENTION

An aspect of the invention proposes an ultra-high-frequency communication-based method for activating a function of a motor vehicle with a portable item of user equipment, based on the presence of said portable item of equipment in predetermined areas around the vehicle, said portable item of equipment transmitting a first signaling event at a predetermined period on at least one signaling channel, said first event comprising at least one signaling frame comprising a data block, said method being noteworthy in that:
  a. a predetermined number of additional signaling events are transmitted to the vehicle during said period, the transmitted signaling events being differentiated from one another by the presence of an additional identifier in the data block,
  b. a request signal is received from the vehicle, for each signaling frame of each event received by said vehicle,
  c. upon receipt of the request signal by the portable item of equipment, a response frame comprising a strength value of the received request signal is sent,
  d. based on the strength values of the received signal, the presence of the portable item of equipment in one of the predetermined areas is determined,
  e. a vehicle function is activated based on the presence, thus determined, of the portable item of equipment.

Preferably, the data are binary, and the event identifier is in the form of at least one additional bit.

Advantageously, the ultra-high-frequency communication may be BLE® protocol communication, having a frequency of between 2.4 GHz and 2.5 GHz.

Preferably, each signaling event comprises at least one additional signaling frame on at least one of the three standardized signaling channels of the BLE communication protocol.

Expediently, the portable item of user equipment comprises an Android® operating system and the predetermined period is greater than or equal to 100 ms.

An aspect of the invention also applies to any portable item of user equipment comprising ultra-high-frequency communication means, including an antenna, and a transceiver, said portable item of equipment being designed to transmit a first signaling event at a predetermined period on at least one signaling channel, said first event comprising at least one signaling frame comprising a data block, noteworthy in that the portable item of equipment furthermore comprises:
  a. means for adding an event identifier to the data block,
  b. means for transmitting additional signaling events during the predetermined period.

The portable item of user equipment comprises a computer program product noteworthy in that it comprises a set of program code instructions that, when they are executed by one or more processors, configure the one or more processors to add a signaling event identifier to the data block of the signaling frame of the signaling event and to transmit additional signaling events during a predetermined period.

Preferably, the ultra-high-frequency communication is BLE® protocol communication having a frequency of between 2.4 GHz and 2.5 GHz and the data block is binary, and the event identifier is in the form of at least one additional bit.

Advantageously, each signaling event comprises at least one additional signaling frame on at least one of the three standardized signaling channels of the BLE communication protocol.

More specifically, the portable item of user equipment comprises an Android® operating system and the predetermined period is greater than or equal to 100 ms.

BRIEF DESCRIPTION OF THE DRAWINGS

Further features and advantages of aspects of the invention will become more clearly apparent from reading the following description. This description is purely illustrative and should be read with reference to the appended drawings, in which:

FIG. 2 shows, according to the prior art, the transmission of two identical signaling events, according to the prior art, separated by a period T, imposed by the BLE protocol, FIG. 3 shows, according to an aspect of the invention, the transmission of multiple signaling events AD1, AD2 . . . ADN consecutively during the period T, FIG. 4 shows, according to an aspect of the invention, the signaling frames ADV_IND sent on channel 37, for each signaling event, AD1, AD2 . . . ADN, FIG. 5 schematically shows the sequence of frames exchanged between the portable item of equipment SD and the vehicle V, allowing the sending of an RSSI measurement from the portable item of equipment SD to the vehicle V.

DETAILED DESCRIPTION OF THE PREFERRED EMBODIMENTS

Figure 1:
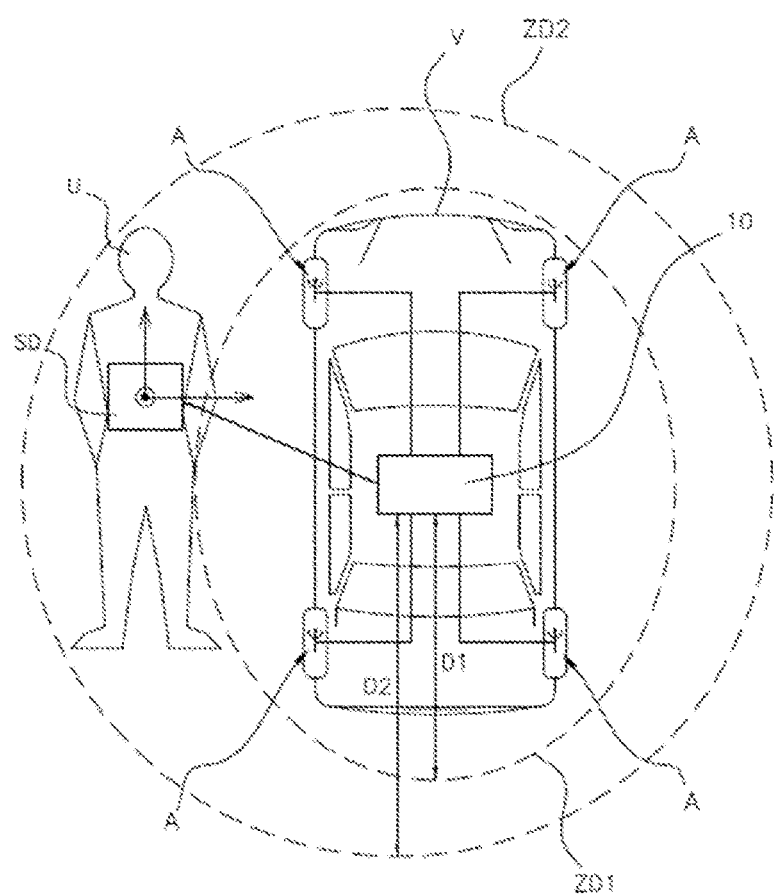
FIG. 1 schematically shows a vehicle V along with a nearby portable item of equipment SD, located in an area ZD2 around the vehicle V.

As already explained, the method for activating a function of the vehicle through BLE communication according to the prior art is not robust. This is illustrated in FIG. 1. In FIG. 1, a user U carrying a portable item of user equipment SD is located in an area ZD2 at a distance from his vehicle V, which area ZD2 does not allow the remote unlocking of the opening elements of the vehicle V. A central control unit 10 on board the vehicle V receives, via BLE antennas A on board the vehicle V, one or more RSSI measurements of the BLE signal received by the portable item of equipment SD and transmitted beforehand by said antennas A. This BLE RSSI signal is subjected to strong interference by the environment, and the number of values received within a reasonable period for the user is insufficient. The analysis of this signal by the control unit 10 is distorted, with the consequence that the control unit 10 locates the portable item of equipment SD in a nearby area ZD1 around the vehicle (located at a distance D1 from the control unit 10), which area ZD1 authorizes the remote unlocking of the opening elements of the vehicle V. The vehicle V is then unlocked, whereas the user is in fact far away from his vehicle V and is located in an area ZD2 with a larger radius D2 around the vehicle V, which area is not authorized for unlocking the vehicle V. This exhibits a major drawback for the safety of the user's property, since there is a significant risk of theft of the vehicle, or of property located in the vehicle V. It is thus necessary to obtain a larger sample of RSSI measurements not only to improve the precision of the locating of the portable item of equipment but also to improve the speed of said locating in order to overcome the problems mentioned in the prior art, in this case the "wall" effect.

An aspect of the present invention proposes a method for activating a vehicle function that makes it possible to overcome the disadvantages cited above.

FIG. 2 shows, according to the prior art, a succession of two identical events, called "advertising" events or signaling events AD1, comprising signaling frames ADV_IND sent on the three standardized channels of the BLE protocol, that is to say channel 37, CH37, channel 38, CH38 and channel 39, CH39 by the portable item of equipment SD. The signaling events AD1 are sent at a minimum period of 100 ms, imposed by the Android operating system of said item of equipment. Each transmission of signaling frames on a channel lasts 3 ms. A signaling event therefore lasts around 10 ms, and there is therefore a period of around 90 ms during which no signaling frame is sent.

FIG. 4, in the first figure located at the top, shows, for the signaling event AD1, the structure of the frame sent on a standardized BLE communication channel, for example channel 37, CH37, according to the prior art. A signaling frame comprises four successive blocks: a preamble PRBLE, an access address ACCESS ADDRESS, data, called PDU1 ("Protocol Data Unit") and a checksum CHKSUM1.

The data PDU1 generally comprise the identifier of the transmitter, for example the identifier of the smartphone transmitting the signaling frame, along with the identifier of the channel, CH37, CH38 or CH39 on which the data are sent.

The data PDU1 of the protocol are generally coded in binary language and are in the form of a string of alternating bits of "0"s and "1"s.

An aspect of the invention proposes to modify the data block PDU1 of the protocol contained in each signaling frame sent on each channel, by adding an event identifier id thereto. This event identifier id consists of at least 1 additional bit added to the data block PDU1.

The transmission of the first signaling event AD1 thus comprises three frames, each transmitted on a separate channel CH37, CH38 and CH39 and each comprising, in the data block, an additional bit, for example coded "0", in order to identify this event as the first event AD1.

According to an aspect of the invention, it is then proposed to transmit, following the first event AD1, that is to say 10 ms after the start of transmission of the first event AD1, and not 100 ms as in the prior art, a second signaling event AD2 of three frames, each frame then comprising, in its data block, the additional bit id, this time coded "1" in order to identify this event as the second event AD2 and to distinguish it from the first event AD1.

In one preferred embodiment of the method according to the invention, the data block comprises the event identifier id in the form of 2 added bits, thus making it possible to obtain four different signaling event states and to be able to transmit a third signaling event AD3, and then a fourth AD4, following the transmission of the second event AD2.

This is illustrated in FIG. 4:
a. the first signaling event AD1 comprises two additional added bits "00" (circled in FIG. 4) upstream of the data frame PDU1,
b. The second signaling event AD2 comprises two additional added bits "10" (circled in FIG. 4), different from those of the first event, upstream of the data frame PDU2.
c. The last "N" (in this case, N=4, and therefore the 4$^{th}$) signaling event ADN also comprises two additional bits "11" (circled in FIG. 4), different from those of the first, second and third (not illustrated) signaling event, still upstream of the data frame PDUN.

Thus, according to an aspect of the invention, during a period of 100 ms, at least one additional signaling event, in this example two additional signaling events AD2, AD3, are thus sent instead of a single event AD1 according to the prior art. This is illustrated in FIG. 3. In practice, the applicant found that it was possible to send a maximum number of seven signaling events during the period of 100 ms. Indeed, the transmissions are separated by uncontrollable delays due to the delays in the activation of the BLE stack that controls the transmissions of the signaling events. It was observed that these delays reduced the possible number of signaling events per predetermined period to seven, instead of 10, which is equal to the period (100 ms) divided by the duration of an event (10 ms).

These consecutive transmissions of signaling events are possible because, although the BLE protocol imposes a period of 100 ms between the repetitive sending of one and the same signaling event, in this case for example AD1, this being called "a project", it mentions nothing about the possibility of creating multiple projects and transmitting them consecutively one after another. These consecutive transmissions are made possible by the clever addition of an additional event identifier id to the data block of the signaling frame, thereby making it possible to distinguish each new project or signaling event from the ones transmitted previously. Thus, during the period of 100 ms, multiple signaling events AD1, AD2 ... ADN dependent on various projects are sent, instead of a single event AD1 or a single project according to the prior art. Of course, the period of 100 ms between the repetitive sending of a signaling event of one and the same project is complied with. Each sent project thus has an event period of 100 ms, as stipulated by the Android operating system.

An aspect of the invention is also made possible by the maximum size of the data frame PDU1, PDU2 ... PDUN, which may comprise up to 250 data bits and which is even extensible, according to the BLE protocol, version 4.2 and higher versions.

Figure 5:
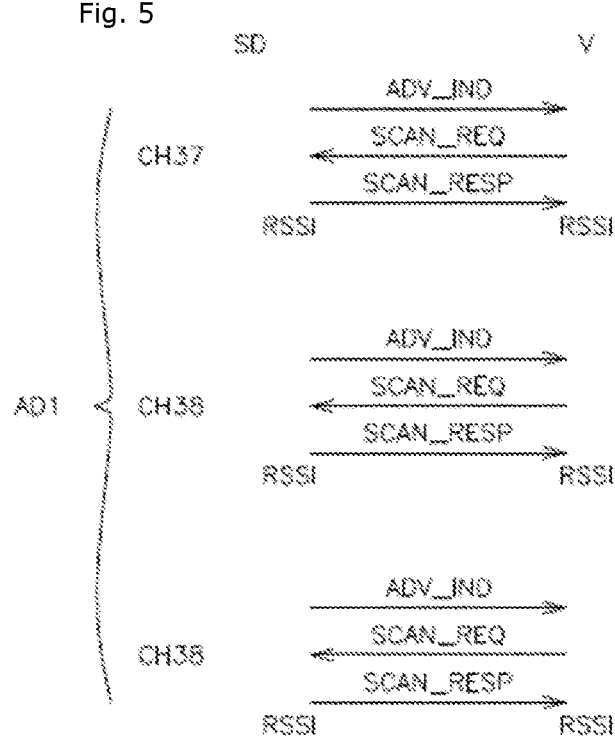

The receipt, by the vehicle V, of the frames of the three signaling events AD1, AD2, AD3 sent by the portable item of equipment SD is followed, for each frame, by the transmission of a request signal sent by the vehicle and called SCAN_REQUEST, according to the BLE protocol. Upon receipt of the request signal SCAN_REQUEST by the portable item of equipment, the portable item of equipment SD responds to the vehicle V by sending a response frame called SCAN_RESPONSE, according to the BLE protocol. This response frame contains the RSSI value of the request signal as measured by the portable item of equipment SD, more specifically the strength of the received signal. This is illustrated in FIG. 5. The vehicle thus receives a plurality of RSSI values from the portable item of equipment SD and is thus able to determine the presence or absence of the portable item of equipment SD in one of the predetermined areas ZD1, ZD2 around the vehicle V.

According to an aspect of the invention, during the period of 100 ms, and according to the example illustrated, the vehicle V thus receives three times more RSSI measurements than the prior art, with a maximum of seven times more RSSI measurements than the prior art. However, with seven signaling events sent during the period of 100 ms, the consumption of the portable item of equipment increases considerably. The applicant considered that three signaling events sent during the period of 100 ms was enough to significantly reduce the duration of locating the portable item of equipment SD.

Thus, locating of the portable item of equipment SD, according to the example illustrated here, is three times faster than the prior art and lasts 40 seconds instead of 2 minutes according to the prior art.

Figure 7:
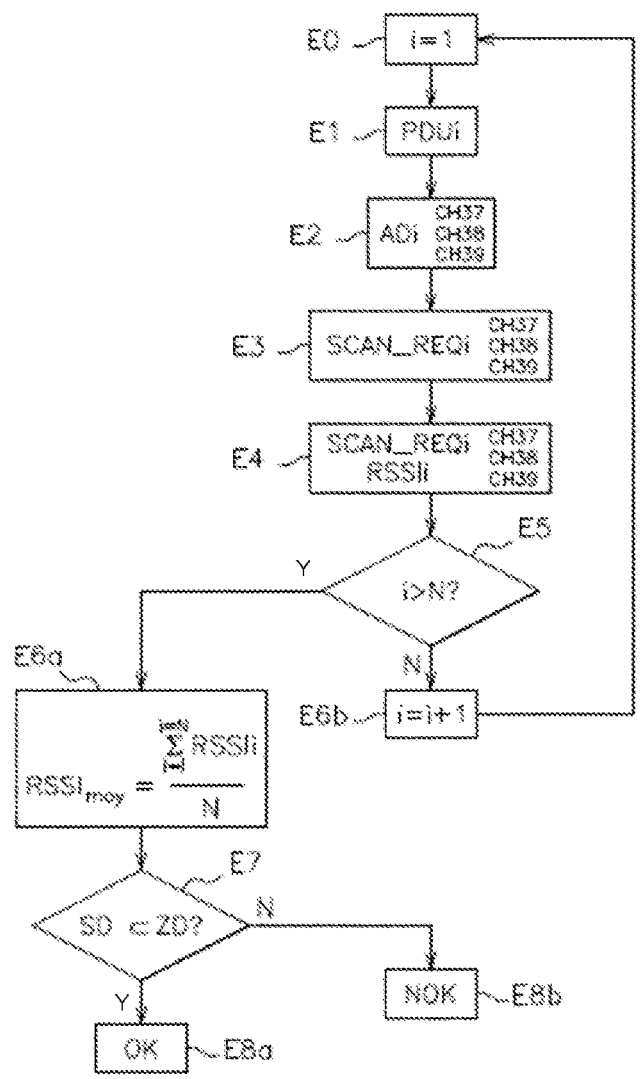
FIG. 7 is a flowchart showing the method for activating a vehicle function according to an aspect of the invention.

The method for activating a vehicle function V according to an aspect of the invention and illustrated in FIG. 7 therefore comprises the following steps:

In the first step E0, the method is initialized and an additional event identifier id, in the form of two additional coding bits, is added to the data block PDUi of the three signaling frames ADV_IND (one frame per channel) (step E1), where i=1, for the first signaling event ADi (where i=1).

In the next step E2, the first signaling event AD1 is transmitted.

In step E3, upon receipt of the first signaling event AD1 by the vehicle, for each received signaling frame, a request signal "SCAN_REQ" is sent, by the vehicle, to the portable item of equipment SD.

In the next step, the portable item of equipment SD, upon receipt of the request signal, in turn transmits a response to each request signal, that is to say on each channel, i.e. three responses, called "SCAN_RESP". Each response contains an RSSI measurement of the strength of the signal (for example SCAN_REQ) received by the portable item of equipment SD (step E4).

If the number of signaling events transmitted is less than a predetermined number N (in our example N=3, at step E5), then i is incremented, i=i+1 (step E6b), and the previous steps are repeated for a second signaling event AD2 by modifying beforehand the coding of one and/or more additional bits of the event identifier id added (steps E1 and E2) to the data block PDUi (where i=2) in order to identify this event as a second event AD2 and to distinguish it from the first event AD1.

If the number of signaling events is greater than the predetermined number N, that is to say i>N (step E5), then statistical calculations are performed on the RSSI measurements thus received, for example, but without limitation, an average of said measurements RSSImoy (step E6a).

The term "statistical calculations" is understood to mean any function or series of mathematical functions that make it possible, based on the received RSSI measurements, to converge on a single RSSI measurement.

This RSSI value RSSImoy then makes it possible to determine the presence of the portable item of equipment SD in one of the predetermined areas around the vehicle, ZD1, ZD2 (step E7). The RSSI values are received by the vehicle V and processed in order to determine the presence of the portable item of equipment SD in one of the predetermined areas.

Depending on the presence of the portable item of equipment SD in said areas, then vehicle functions are activated (step E8a).

If the portable item of equipment SD is not located in any of the predetermined areas around the vehicle V, then no function is activated (step E8b).

Figure 6:
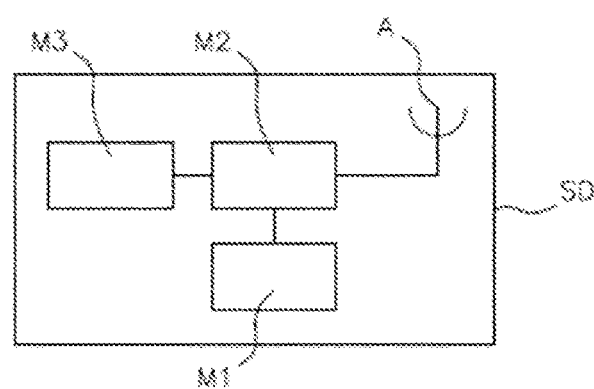
FIG. 6 shows a portable item of equipment DS according to an aspect of the invention.

To carry out the method for activating a function according to an aspect of the invention, the portable item of equipment SD comprises (see FIG. 6):
  a. means for BLE communication, including an antenna A and a BLE transceiver M2,
  b. means M1 for adding an event identifier id in the form of coding bits added to the data block PDUi of the signaling frame for each signaling event,
  c. means M3 for transmitting additional signaling events during the predetermined period T.

Said means M1 for adding event identifiers, and the transmission means M3 are in the form of software, contained for example in a microcontroller of the portable item of equipment SD. The means for transmitting additional signaling events consist of an internal clock and signaling of the end of the previous frame, also called a flag, that is to say a software interrupt for guaranteeing that the signal has been sent, the spacing of which is linked to the length of the frame.

An aspect of the invention thus makes it possible, expediently and inexpensively, to considerably increase the number of RSSI measurements per unit of time, in order to quickly locate the portable item of equipment SD in predetermined areas around the vehicle V and thus to activate or not activate the corresponding vehicle functions.

The invention claimed is:

1. An ultra-high-frequency communication-based method for activating a function of a motor vehicle with a portable item of user equipment, based on the presence of said portable item of user equipment in predetermined areas around the motor vehicle, said portable item of user equipment transmitting a first signaling event at a predetermined period on at least one signaling channel, said first signaling event comprising at least one signaling frame comprising a data block, said method comprising:

a) a predetermined number of additional signaling events are transmitted to the motor vehicle during said predetermined period, the transmitted signaling events being differentiated from one another by the presence of an additional identifier in the data block;
b) a request signal is received from the motor vehicle, for each signaling frame of each signaling event received by said motor vehicle;
c) upon receipt of the request signal by the portable item of user equipment, a response frame comprising a strength value of the received request signal is sent;
d) based on the strength values of the received request signal, the presence of the portable item of user equipment in one of the predetermined areas is determined; and
e) a vehicle function is activated based on the presence, thus determined, of the portable item of user equipment.

2. The activation method as claimed in claim 1, wherein the data block is binary, and that the event identifier is in the form of at least one additional bit.

3. The activation method as claimed in claim 1, wherein the ultra-high-frequency communication is a BLE® protocol communication, having a frequency of between 2.4 GHz and 2.5 GHz.

4. The activation method as claimed in claim 3, wherein each signaling event comprises at least one additional signaling frame on at least one of the three standardized signaling channels of the BLE communication protocol.

5. The activation method as claimed in claim 3, wherein the portable item of user equipment comprises an Android® operating system and in that the predetermined period is greater than or equal to 100 ms.

6. The activation method as claimed in claim 2, wherein the ultra-high-frequency communication is a BLE® protocol communication, having a frequency of between 2.4 GHz and 2.5 GHz.

7. A portable item of user equipment comprising ultra-high-frequency communication means, including an antenna, and a transceiver, said portable item of equipment being designed to transmit a first signaling event at a predetermined period on at least one signaling channel, said first event comprising at least one signaling frame comprising a data block the portable item of equipment furthermore comprising:
a) means for adding an event identifier to the data block; and
b) means for transmitting additional signaling events during the predetermined period.

8. The portable item of user equipment as claimed in claim 6, comprising a non-transitory computer program product, comprising a set of program code instructions that, when they are executed by one or more processors, configure the one or more processors to add a signaling event identifier to the data block of the signaling frame of the signaling event and to transmit additional signaling events during the predetermined period.

9. The portable item of user equipment as claimed in claim 6, wherein the ultra-high-frequency communication is a BLE® protocol communication having a frequency of between 2.4 GHz and 2.5 GHz and the data block is binary, and the event identifier is in the form of at least one additional bit.

10. The portable item of user equipment as claimed in claim 9, wherein each signaling event comprises at least one additional signaling frame on at least one of the three standardized signaling channels of the BLE communication protocol.

11. The portable item of user equipment as claimed in claim 9, comprising an Android® operating system and wherein the predetermined period is greater than or equal to 100 ms.

12. The portable item of user equipment as claimed in claim 8, wherein the ultra-high-frequency communication is a BLE® protocol communication having a frequency of between 2.4 GHz and 2.5 GHz and the data block is binary, and the event identifier (id) is in the form of at least one additional bit.

* * * * *